US007739230B2

(12) United States Patent  (10) Patent No.: US 7,739,230 B2
Bourne et al.  (45) Date of Patent: Jun. 15, 2010

(54) LOG LOCATION DISCOVERY AND MANAGEMENT

(75) Inventors: Donald Alexander Bourne, Toronto (CA); Nellie T. Klump, Toronto (CA); Christine Nancy Knight, Toronto (CA); Eric E. Labadie, Toronto (CA); Balan Subramanian, Cary, NC (US); Michael LaVerna Wamboldt, Garner, NC (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 11/836,533

(22) Filed: Aug. 9, 2007

(65) Prior Publication Data
US 2009/0043825 A1 Feb. 12, 2009

(51) Int. Cl.
*G06F 7/00* (2006.01)
*G06F 17/00* (2006.01)
(52) U.S. Cl. ...................................................... 707/603
(58) Field of Classification Search ....................... None
See application file for complete search history.

(56) References Cited

U.S. PATENT DOCUMENTS

| 6,247,149 | B1 | 6/2001 | Falls et al. |
| 6,470,388 | B1 | 10/2002 | Niemi et al. |
| 2004/0111505 | A1* | 6/2004 | Callahan et al. .............. 709/223 |
| 2004/0133541 | A1 | 7/2004 | Meredith et al. |
| 2005/0076006 | A1 | 4/2005 | D'Angelo et al. |
| 2005/0160421 | A1 | 7/2005 | Bluvshteyn et al. |
| 2005/0160427 | A1 | 7/2005 | Ustaris |
| 2005/0240590 | A1 | 10/2005 | Shimizu et al. |
| 2006/0112175 | A1* | 5/2006 | Sellers et al. ................ 709/223 |
| 2007/0121596 | A1* | 5/2007 | Kurapati et al. .............. 370/356 |

* cited by examiner

*Primary Examiner*—Uyen T. Le
(74) *Attorney, Agent, or Firm*—Yee & Associates, P.C.; Jeffrey S. LaBaw

(57) ABSTRACT

Illustrative embodiments provide a computer implemented method for managing log information. The method comprising, responsive to receiving a request to discover log information, and invoking a set discovery agents to discover the log information for logs located on a set of managed nodes. The method further identifies the log information on the set of managed nodes using the set of discovery agents and stores the log information in a repository knowledge base containing log information.

20 Claims, 11 Drawing Sheets

| DynamicDiscovery 1100 | | | |
|---|---|---|---|
| ⚙ cancelScheduledDiscovery | | | |
| ⇧ input | ▯ cancelScheduledDiscoveryInput | e cancelScheduledDiscoveryInput | |
| ⇩ output | ▯ cancelScheduledDiscoveryOutput | e cancelScheduledDiscoveryOutput | |
| ▤ fault | ▯ cancelScheduledDiscoveryError | e cancelScheduledDiscoveryError | |
| ⚙ scheduleDiscovery | | | |
| ⇧ input | ▯ scheduleDiscoveryInput | e scheduleDiscoveryInput | |
| ⇩ output | ▯ scheduleDiscoveryOutput | e scheduleDiscoveryOutput | |
| ▤ fault | ▯ scheduleDiscoveryError | e scheduleDiscoveryError | |
| ⚙ startDiscovery | | | |
| ⇧ input | ▯ startDiscoveryInput | e startDiscoveryInput | |
| ⇩ output | ▯ startDiscoveryOutput | e startDiscoveryOutput | |
| ▤ fault | ▯ startDiscoveryError | e startDiscoveryError | |

*FIG. 11*

| COLUMN NAME | TYPE | DESPCRIPTION 1400 |
|---|---|---|
| UID | VARCHAR(32) | UNIQUE IDENTIFIER FOR THE LOG PATTERN |
| NAME | VARCHAR(1024) | COMMON NAME FOR THE LOG |
| MANIFEST | VARCHAR(32) | PHYSICAL MANIFESTATION OF THE LOG (FILE, COLLECTION, COMMAND) |
| COMMAND | VARCHAR(2048) | PREPROCESSOR COMMAND AND COMMAND OPTIONS DELIMITED BY A SEMI-COLON |
| DIRECTORY | VARCHAR(2048) | RELATIVE DIRECTORY WHERE THIS LOG CAN BE FOUND |
| EXTENSION | VARCHAR(32) | LOG EXTENSION |
| OTHER | VARCHAR(4000) | OTHER NAME VALUE PAIRS DISTINGUISHING THE PHYSICAL PROPERTIES OF THIS LOG |

*FIG. 14*

| COLUMN NAME | TYPE | DESCRIPTION | 1500 |
|---|---|---|---|
| UID | VARCHAR(32) | UNIQUE IDENTIFIER FOR THE APPLICATION PATTERN | |
| NAME | VARCHAR(1024) | COMMON NAME FOR THE APPLICATION | |
| INSTALLDIRECTORY | VARCHAR(2048) | DIRECTORY WHERE THE APPLICATION IS INSTALLED | |
| VERSION | VARCHAR(80) | VERSION NUMBER OF THE APPLICATION | |
| EXECUTABLE | VARCHAR(1024) | NAME OF THE APPLICATION EXECUTABLE | |
| ABBREVIATIONS | VARCHAR(1024) | LIST OF ABBREVIATIONS THAT THIS APPLICATION CAN GO BY | |

*FIG. 15*

| COLUMN NAME | TYPE | DESCRIPTION | 1600 |
|---|---|---|---|
| UID | VARCHAR(32) | UNIQUE IDENTIFIER FOR THE APP-LOG PATTERN RELATIONSHIP | |
| APPPATERN_UID | VARCHAR(32) | UID FOR THE APPLICATION PATTERN | |
| LOGPATTERN_UID | VARCHAR(32) | UID OF THE LOG PATTERN | |

*FIG. 16*

LOG LOCATION DISCOVERY AND MANAGEMENT

BACKGROUND OF THE INVENTION

1. Field of the Invention

The present invention relates generally to an improved data processing system, and in particular to a computer implemented method, data processing system and computer program product for discovering and managing log data.

2. Description of the Related Art

During problem determination in a distributed environment at the application level, or the operating system level, there is often a requirement to examine information logged in application or operating system specific log files. A difficulty many users typically face involves identifying the exact location of the log files required for problem analysis.

Typically, tools in the industry are available for discovering physical resources and installed applications, but not for the discovery of log file locations. Some tools analyze details of application executables and other application footprint information mainly for inventory purposes but cannot be used for problem determination.

With the tools available today, performing problem analysis in a distributed environment using application or system log files typically presents a number of challenges to users. Users may need to know the locations of all the log files of all the applications running on each machine in the network in order to identify a problem. Users also may require access to all machines within the network and manually retrieve the log files across the network for analysis. Alternatively, tools may be used that require installation of agents on all machines on a network. Some known techniques may require applications on a remote host to instantiate debug objects, and track any kind of error, trace or debug information generated by that application. Additionally, users may need to know specific details about the log file, such as location, version, encoding, locale, application install directory, and other relevant information to obtain and analyze the log file data. These and other factors increase the time required to identify a problem, and increases the need for system administrators to know detailed application information of installed products in a distributed network.

Current solutions include systems for managing log files through files defined in a configuration file, and copying physical log files using an archiving utility where the log files may be merged into a single log file or may be maintained in a central repository. Solutions such as these are typically limited in scope to a single personal computer and are therefore not scalable for large distributed networks. Copying all physical log files in each system on a distributed network to a single repository places extra load on network traffic, and may result in an extremely large and difficult to manage repository. Typical solutions may also be limited in terms of types of log files that can be archived or managed since the solution requires prior knowledge of log file types to be provided in a configuration file.

SUMMARY OF THE INVENTION

The illustrative embodiments provide a computer implemented method, data processing system and computer program product for discovering log information, maintaining this information, and enabling a user to retrieve physical log files based on the stored log information.

In one illustrative embodiment, there is a computer implemented method for managing log information, the computer implemented method comprising, responsive to receiving a request to discover log information, invoking a set discovery agents to discover the log information for logs located on a set of managed nodes, identifying the log information on the set of managed nodes using the set of discovery agents, and storing the log information in a repository knowledge base containing log information.

In another illustrative embodiment, there is a data processing system for managing log information, the data processing system comprising a bus, a storage device connected to the bus, the storage device containing computer executable program code, a communications unit connected to the bus; and a processor connected to the bus, wherein the processor executes the computer executable program code to, responsive to receiving a request to discover log information, invoke a set discovery agents to discover the log information for logs located on a set of managed nodes, identify the log information on the set of managed nodes using the set of discovery agents, and store the log information in a repository knowledge base containing log information.

In yet another illustrative embodiment, there is a computer program product for managing log information, the computer program product comprising: a computer usable recordable type medium having computer executable program code tangibly embodied thereon, the computer executable program code comprising computer executable program code responsive to receiving a request to discover log information, for invoking a set discovery agents to discover the log information for logs located on a set of managed nodes, computer executable program code for identifying the log information on the set of managed nodes using the set of discovery agents and computer executable program code for storing the log information in a repository knowledge base containing log information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a tabular representation of an interface for the discovery service in accordance with illustrative embodiments;

FIG. 14 is tabular view of a database definition for log patterns as used with the discovery service of FIG. 3 in accordance with illustrative embodiments;

FIG. 15 is tabular view of a database definition for application patterns as used with the discovery service of FIG. 3 in accordance with illustrative embodiments; and FIG. 16 is tabular view of a database definition for relating log patterns with application patterns as used with the discovery service of FIG. 3 in accordance with illustrative embodiments.

DETAILED DESCRIPTION OF THE PREFERRED EMBODIMENT

Figure 1:
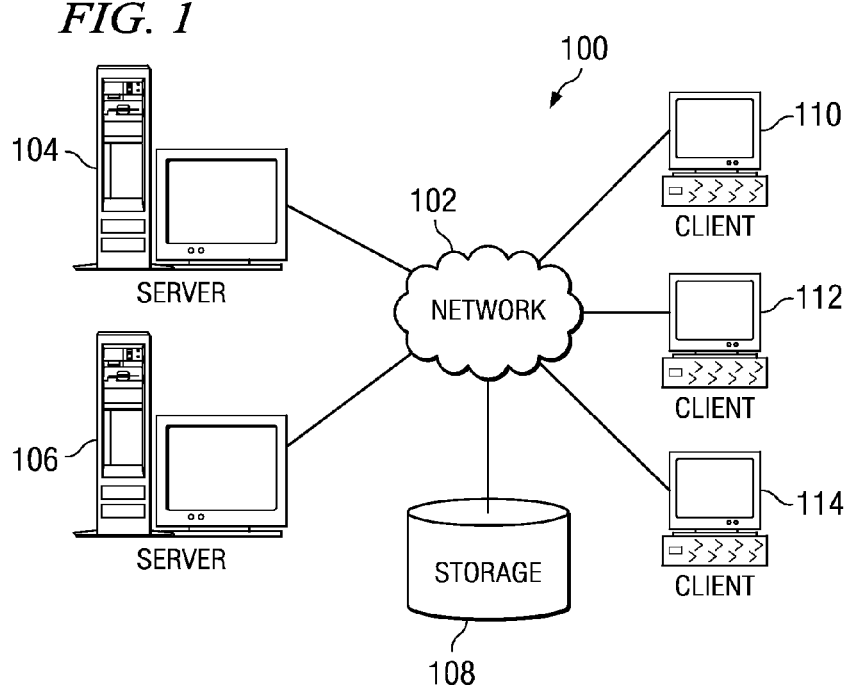
FIG. 1 is a pictorial representation of a network of data processing systems in which illustrative embodiments may be implemented.
Figure 2:
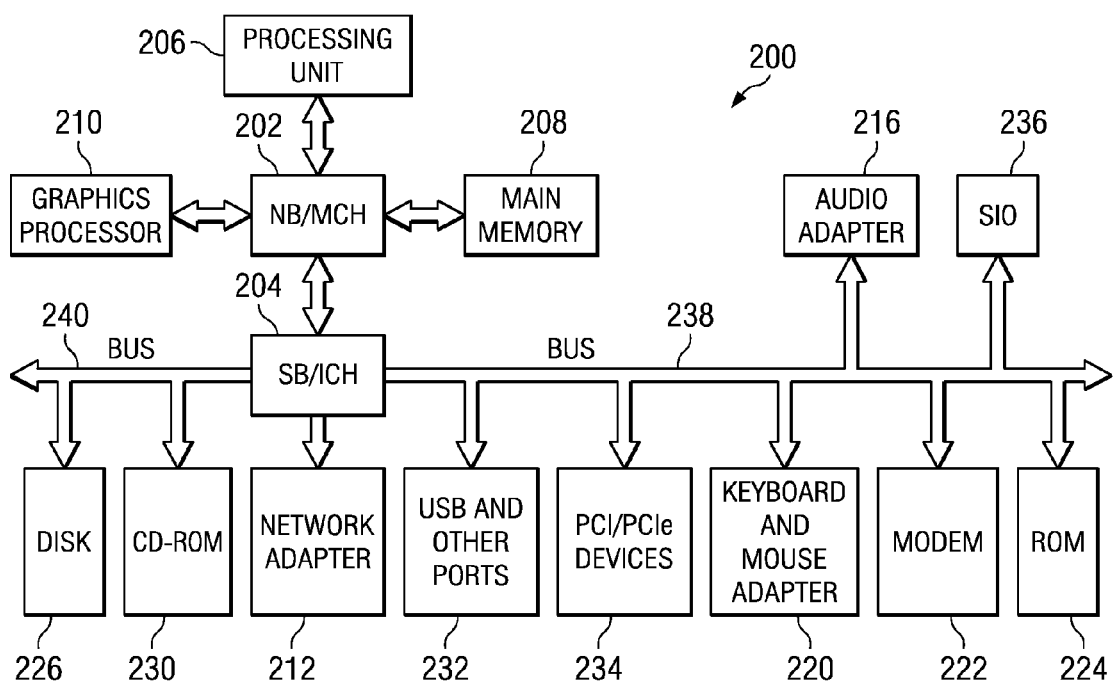
FIG. 2 is a block diagram of a data processing system that may be implemented as a server in accordance with illustrative embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, network adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204. Network adapter 212 may provide services comprising a local area network adapter and may further comprise services for firewall and router functionality.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
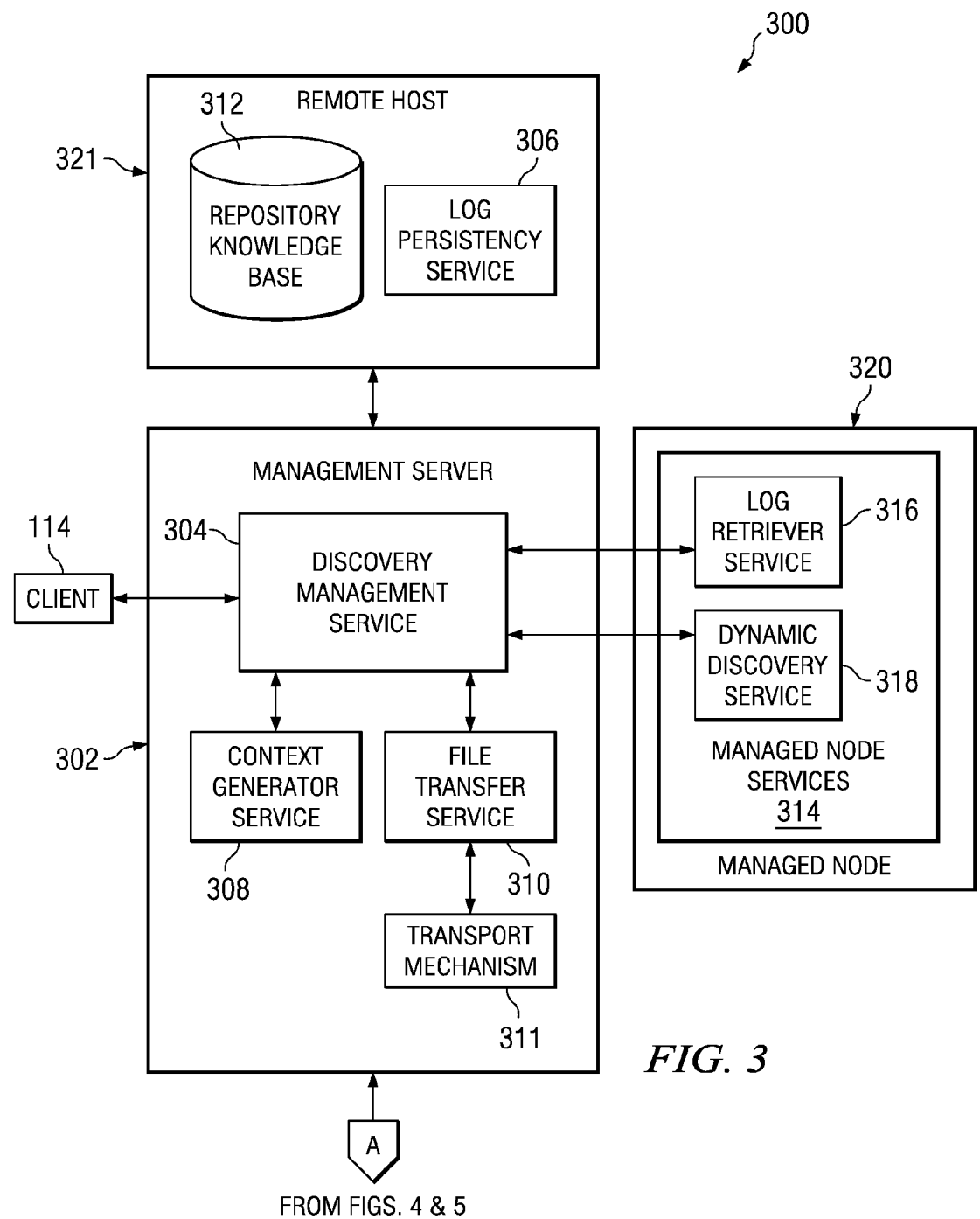
FIG. 3 is a block diagram of components of a log location discovery and management system in accordance with illustrative embodiments.

With reference now to FIG. 3, an illustrative embodiment is provided of log discovery and management services 300 as may be built on a services oriented architecture, thus broadening the scope of distributed systems and network environments in which the embodiment may be integrated and employed such as that in FIG. 1. Further, such an embodiment as may be implemented on systems comprising that which is exemplified in, but not limited to the data processing system of FIG. 2, does not require maintaining state information of any kind. The services described use processor cycles only when a request is received, and then performs a simple service of retrieving the physical log file or a portion of the log file from the remote host. There is no requirement to change existing applications, nor is there a requirement on the applications to implement an interface in order to communicate with this log management system. Additionally embodiments may be integrated into an existing environment, managing log locations of that network through dynamic discovery of log locations and the management of those log locations in a central repository.

Log information that is being gathered and processed by illustrative embodiments is descriptive in nature rather than the physical content of the various logs. The log information of interest relates to the attributes of the log and not the actual content of the log. For example, attributes describe the characteristics of the log rather than the physical content. Log attributes include those that describe the location of the log, applications that created or added to the log, a timestamp indicating when the log was last updated, the size of the log, the name, log extension or file type and character coding used. This information may be part of the metadata defining the unique character of the log information. The two aspects of the log are thus defined so that the first is descriptive as just explained and the second is the actual data content of the log. The following examples and illustrative embodiments deal with the first aspect as a means to manage more effective use of the second aspect.

Illustrative embodiments of log discovery and management services 300 include management server 302 containing services comprising discovery management service 304, in the form of a collection of related services providing a single point of access for a user of the services, such as client 114 of FIG. 1. File transfer service 310 provides physical movement services to move log files from a remote managed node 320. File transfer service 310 also includes transport mechanism 311 that may be used to process the selected logs further, for example compressing, during retrieval. Further, context generator 308 may be used to generate a usage context for a retrieved log file. The usage context may be required when importing a log resource into an existing tooling environment. Context generation may, for example, allow for additional formatting of the log resource information to fit the needs of a specific tool.

Interfacing with discovery management service 304 to handle persistent storage of log information is log persistency service 306 that in turn interfaces with a repository such as repository knowledge database 312. Log persistency service 306 interfaces with repository knowledge database 312 to perform query, save and retrieval operations related to the log file information going into or being extracted from the repository. Both log persistency service 306 and repository knowledge database 312 are shown on remote host 321; however they may be located on management server 302 as an alternative.

Managed node 320, in an illustrative embodiment, may comprise services such as log retriever service 316 and dynamic discovery service 318 that may be combined with other services in managed node services 314. Managed node services 314 may additionally contain services to aid in the function of log retrieval and log discovery agents as well as update and communication functions related to maintaining linkage to discovery management services 304. Log retriever service 316 provides services for the retrieval, packaging and filtering of log resources. Dynamic discovery service 318 provides a means to discover new log file resources on a scheduled basis. Defined agents, such as a log retriever service 316 and a dynamic discovery service 318 may be used for gathering metadata about log files and for retrieving the physical log files from a computer system. Dynamic discovery service 318 searches for log location information based on a known set of application and log file patterns, and scans a target system, for example a system registry or directory, rather than scanning the physical applications and executables themselves, minimizing the scanning time required. Although scanning directories takes time as well, the time taken is typically less than the time required for scanning related physical applications and executables.

Figure 4:
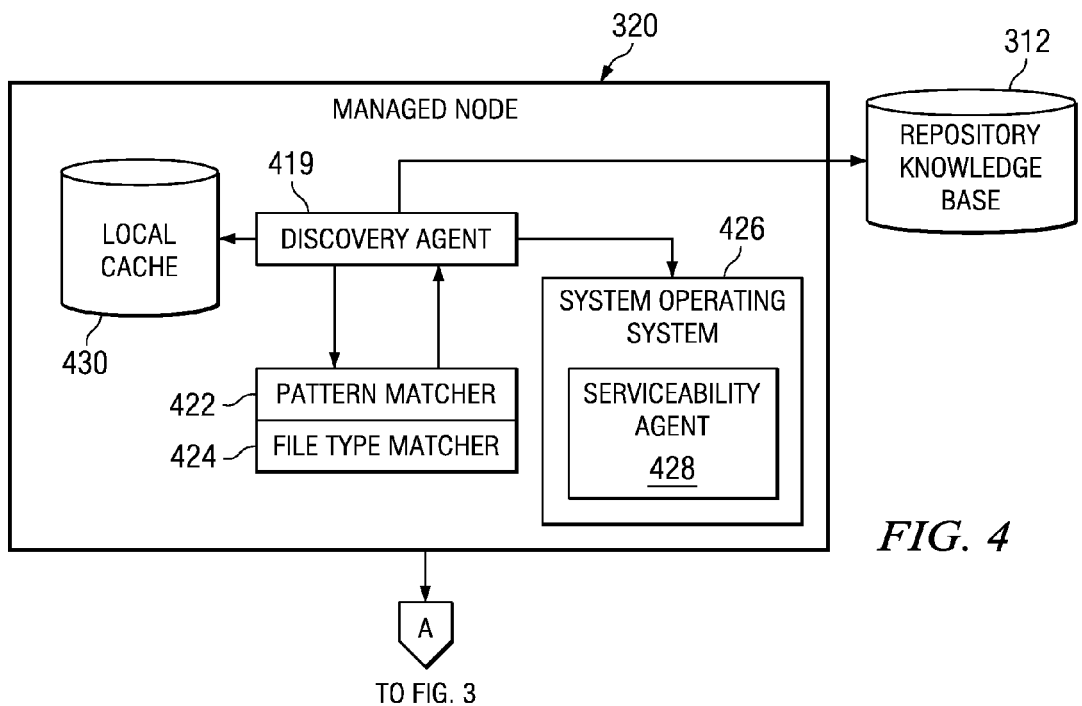
FIG. 4 is a further detail block diagram of the discovery service of FIG. 3 in accordance with illustrative embodiments.

With reference to FIG. 4, there is depicted a block diagram in further detail of dynamic discovery service 318 on managed node 320 of FIG. 3. Discovery agent 419 uses the services of pattern matcher 422 and file type matcher 424 in combination with information obtained from repository knowledge base 312 to aid in determining if the found log resource matches any known patterns. Discovery agent 419 may also store found information locally in local cache 430 for later use. Storage in local cache 430 does not preempt sending information to discovery management service 304, of FIG. 3, for storage in repository knowledge base 312 but may serve as a temporary local information repository for discovery agent 419.

Managed node 320 may further comprise system operating system 426 containing applications generating log information of interest. System operating system 426 may also include serviceability agent 428 to aid in the gathering of log information or other system information of interest. Serviceability agent 428 may comprise functions enabling services including remote procedure invocation as may be needed by discovery agent 419.

Figure 5:
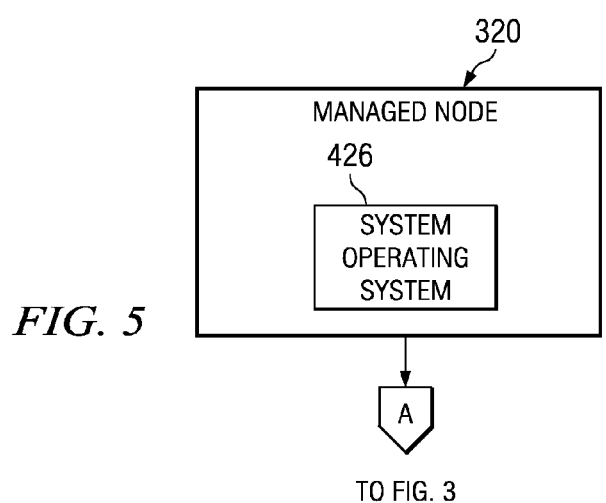
FIG. 5 is a further detail block diagram of the discovery service of FIG. 3 without agent in accordance with an illustrative embodiment.

Turning to FIG. 5, there is depicted a block diagram of managed node 320. In this instance managed node 320 is without managed node support services as in FIG. 4. In particular, managed node of FIG. 5 has only system operating system 426. Discovery services will have to rely on, and communicate with, system operating system 426 services for any data gathering, processing and transmission services. Having no agent requires exploiting the operating system functionality to access the log files through use of operating system provided functions comprising capabilities to execute remote functions, programs, procedures or similar means to communicate and extract needed information.

Illustrative embodiments include a schema for representing computer application and services information, an agent or engine that collects inventory information about the system, and an optional computation based on system attributes to produce an Extensible Markup Language (XML) log file containing the detailed application information of the system. The log file may be implemented using XML, or may also be in one of many proprietary formats. The log file may then be stored in a central repository for inventory purposes, software compatibility, or vendor information.

In the different embodiments, a detailed interface to the repository knowledge base 312, of FIG. 3 and FIG. 4, is provided to enable multiple implementations of the repository to suit the needs of the existing network environment. The repository interface enables different data structures, such as physical databases or simply a flat file to be used as the repository.

The defined schema represents the physical and logical properties of a log file location, and is much more granular than application and services information typically stored by other techniques. Using the defined schema, the exact location of an application log file, the application version, processing required to read the log file, and additional attributes that may be used for reading or processing the log file may be determined.

The log file metadata representing the physical and logical properties of the log is stored in a central repository in these examples. Although log file metadata is illustrated other information may be stored in addition to this metadata, depending on the embodiment. One result is reducing the amount of disk space required and network traffic in transferring physical log files over the network to be stored centrally.

Additional capabilities for managing diagnostic logging information in a local cache, methods for caching distributed logging information, and methods for retrieving cached diagnostic information are included.

Thus, inventoried log files may be broader than just diagnostic log files. These log files may then be tracked, and retrieved, for analysis. Other techniques may have limited the logging information cached to a format as understood by a local caching system, since there may be a need to store the diagnostic information based on time stamps, indicating that the diagnostic log file needs to comply with a certain format. Illustrative embodiments are not restricted to a specific log file format, further providing support for common logging formats including Common Base Event v1.0.1 format, Web Services Distributed ManagementEvent Format (WEF) 1.0+ formats, and other native logging formats.

To reduce the number of multiple transfers, capabilities exist for filtering log data prior to retrieval. The filtering can be done based on a time stamp, severity or any other property that exists in a log file. Filtering may be done at managed node 320, of FIG. 3 and FIG. 4, location, discovery management service 304, of FIG. 3, or at the application calling the discovery services. Additional capability may be provided for compressing log files for transmission to reduce transfer times as well as file transfer service 310, of FIG. 3, comprising a choice of methods of transferring files from a remote machine to a local machine, depending on the network environment. Once the log file is transferred to the client machine, users have full access to the information, and if more information is needed, filtering may be changed to retrieve the required information.

An illustrative embodiment thus stores only log location information and other attributes as metadata including additional processing information, allowing the physical log file to be later retrieved at the time of problem determination.

The log management services enhance problem determination by providing a log discovery service to discover and store log metadata in a central repository, and providing operations to query this repository for log location information based on user-specified criteria. A suite of services working together as a single unit is provided comprising a service that dynamically discovers log location information and log metadata based on a knowledge base in the form of a self-learning adaptive service that builds the knowledge base each time it encounters a new log location pattern, stores log metadata in a repository and provides interfaces to store, retrieve and query this data, retrieves and processes the physical log files based on user-specified query criteria using the stored log metadata, transfers log files from remote machines to the requesting client machine; optionally generates application-specific context for a set of log files to allow the log files to be processed by specific problem determination tools, and optionally a central management service that coordinates activity.

If the log retrieval service tries to load a registered log file that does not exist anymore, the log retrieval service will automatically update the persistency service to remove the non-existent log entry. The same logic applies as well with the dynamic log discovery service. The dynamic log discovery service caches the discovery results and verifies if the discovered log files still exist when invoked. If the discovered log files no longer exist, then the dynamic log discovery service will automatically request the persistency service to remove this non-existent log file entry.

An illustrative embodiment typically simplifies the process of log analysis for a user performing log analysis by providing capabilities to access all nodes in a distributed network from a single point, query log location information based on user-specified criteria, transfer log files from remote host to client machine, and filter log information prior to import by time, severity, and event properties where the filters may be applied on a management server/remote nodes. Capability is also provided for import/export of logs to and from existing tools such as, but not limited to, Eclipse Log and Trace Analyzer, Portal Log Analyzer and Rich Client Platform Log Analyzer. Implementing an illustrative embodiment as a web service allows the embodiment to be easily extended to include other data formats, additional operations and processes required for problem determination.

Figure 6:
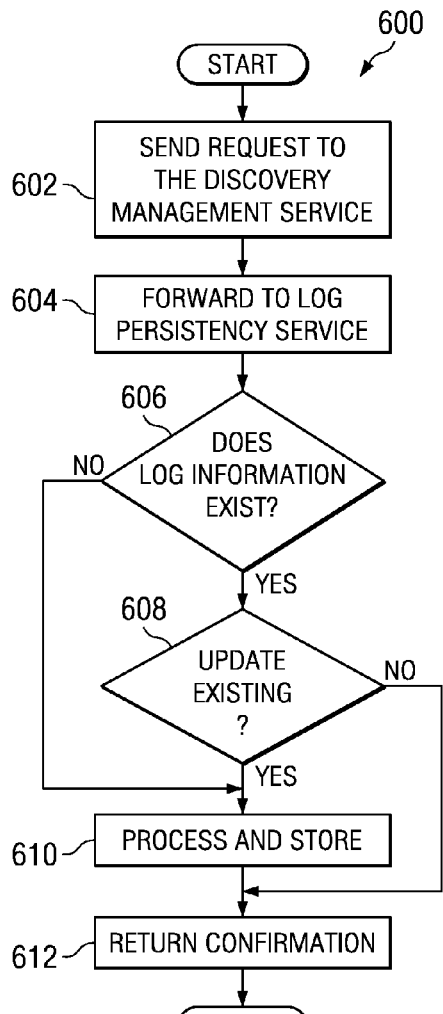
FIG. 6 is a flowchart of a registration request process in accordance with an illustrative embodiment.

An illustrative embodiment typically provides the ability to register log location information through a Web Service (WS) client. With reference to FIG. 6, there is depicted a flowchart of registration request process 600. A client, such as client 114 previously described in FIG. 1, for example, sends a request to the discovery management service 304, in FIG. 3, (step 602) as may be implemented on management server 302, in FIG. 3, an instance of server 104 of FIG. 1. The request is to register log files by specifying, a single log file or a log set, which can be specified in a number of supported formats.

Discovery management service 304, in FIG. 3, processes the request sending it along to Log Persistency Service 306 (step 604). Log persistency service 306 queries existence of the provided information (step 606). If "yes" in step 606, then a prompt is made to determine if an update of existing data is to be made (step 608). If "yes" in step 608, process 600 moves to process and store or register the log files in the repository knowledge base 312, in FIG. 3, through calls to repository stored procedures (step 610). If "no" in step 606, process 600 moves to step 610 directly. If "no" in step 608, process 600 would bypass step 610 and not perform the process and store operation. A confirmation is returned, if step 610 is performed, otherwise a message informing that the data already existed is returned to discovery management service 304 in FIG. 3. Discovery management service 304 in FIG. 3 returns results of the registration request to the client 114 in FIG. 3.

Figure 7:
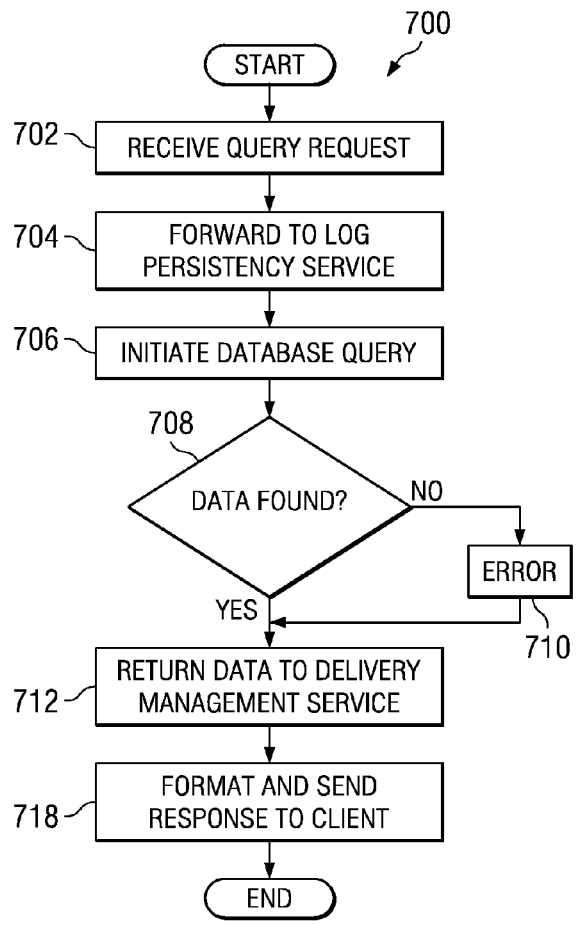
FIG. 7 is a flowchart of a process to query log location information in accordance with an illustrative embodiment.

With reference to FIG. 7, there is depicted a flowchart of a process to query log location information using process 700 by client 114 in FIG. 1. Discovery management service 304 in FIG. 3, receives a request from client 114 to obtain location information about one or more log files (step 702). Discovery management service 304 processes the client request passing the request to log persistency service 306 (step 704). Log persistency service 306 uses search criteria, provided in the client request, to initiate a search of the database (step 706). If the requested data is found, "yes" in step 708 process 700 returns results to discovery management service 304 (step 712). Discovery management service 304 then formats and sends the log location information matching the specified criteria back to client 114 (step 718). If "no" in step 708, an error would be raised (step 710) and process 700 would provide the error indication to discovery management service 304 (step 712).

Figure 8:
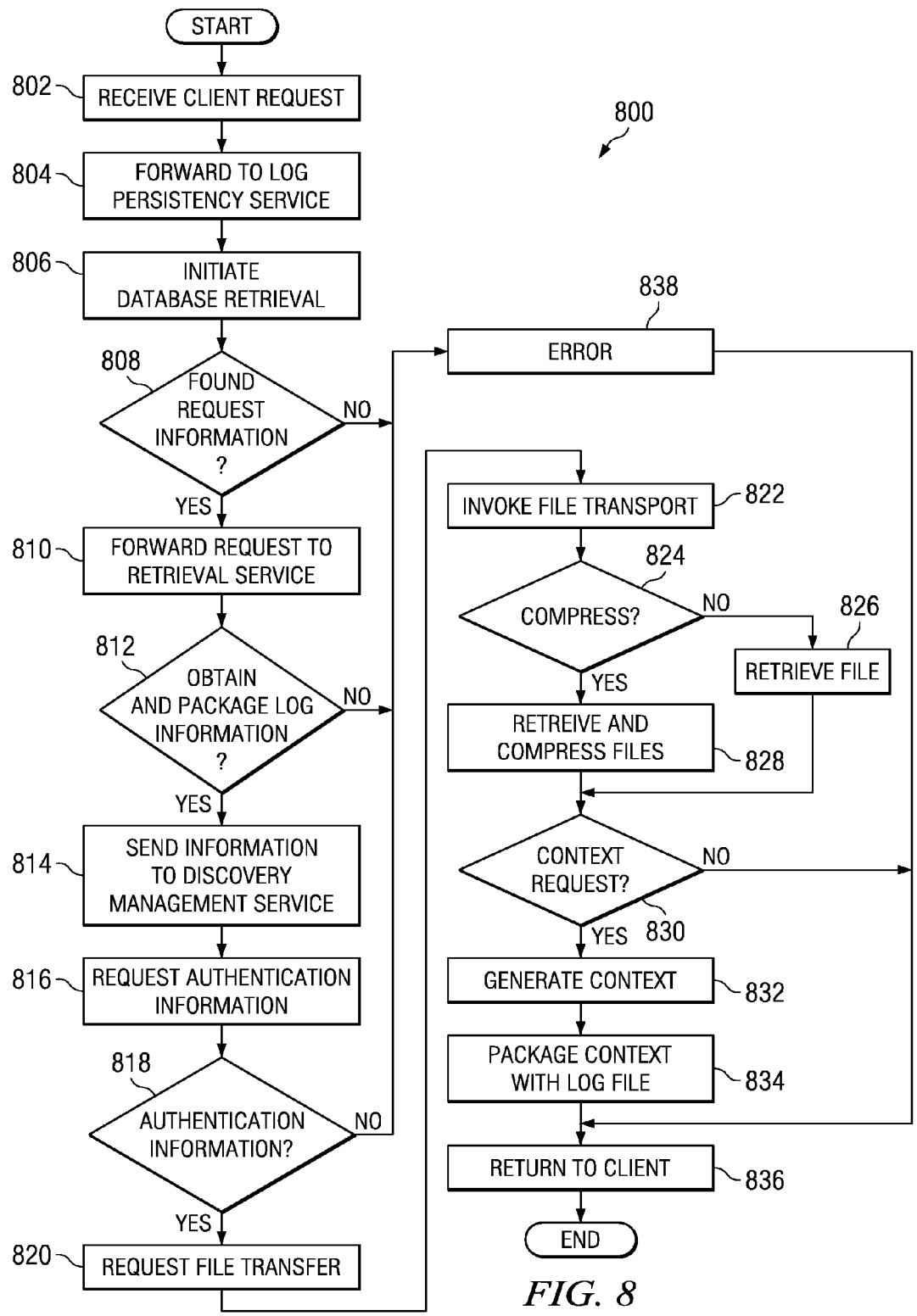
FIG. 8 is a flowchart of a process for retrieving a set of physical logs or a single log file in accordance with an illustrative embodiment.

Turning to FIG. 8, there is depicted a process for retrieving a set of physical logs or a single log file by client 114. In process 800 of FIG. 8, discovery management service 304 receives a request from client 114 to retrieve a log file or a log set (step 802). Discovery management service 304 processes client 114 request and forwards to log persistency service 306 (step 804) to retrieve the full log set and log file location information from repository knowledge base 312 based on client 114 specified filters. Log persistency service 306 initiates a database query for the log location information (step 806). If the requested information is found (step 808), a "yes" discovery management service 304 sends a request to log retriever service 316 to retrieve log files specified in the log set, or single log location (step 810). If the requested information is not found, a "no" in step 808 an error is raised (step 838).

Log retriever service 316 attempts to retrieve the requested information (step 812). If "yes" in step 812, the log retriever processes and packages the one or more log files in a log set as required. Processing of log files only occurs if filters are specified in the request, otherwise the log file is just retrieved. Log Retrieval Service 316 sends confirmation of the operation back to discovery management service 304 (step 814). If "no" in step 812, then and error is raised (step 838).

Discovery management service 304 next sends a request to log persistence service 306 to obtain authentication information to access the managed node (step 816). A database request is initiated for a user id and password required to access managed node 320 (step 818). If the authentication data is not available, step 818 is "no" and an error is raised (step 838). Otherwise the information is located and retrieved from repository knowledge base 312 and sent back to discovery management service 304 (step 818). As well, the system administrator, or other authorized person, must configure management server 302 to give authorized users access to the log file in order for discovery management service 304 to retrieve the log file. Discovery management service 304 makes a request to file transfer service 310 to retrieve the files from managed node 320 (step 820).

In response to receiving the request, file transfer service 310 invokes file transport mechanism 311 to retrieve the remote file (step 822). The transport mechanism determines if the data is to be compressed (step 824). If "yes" in step 824, then process 800 moves to retrieves the remote file and compress, based on client criteria provided in the request, for faster transport (step 828). Otherwise, process 800 moves to retrieve the file without compress processing (step 826).

Discovery management service 304 may request an application context to be generated from the context generator service 308 if that was requested by the client (step 830). If "yes" in step 830, context generator service 308 creates the context (step 832). Discovery management service 304 packages the context with the log data retrieved by file transfer service 310 (step 834). The data is then returned to client 114 (step 836). If "no" in step 830, then discovery management service 304 returns the data, without context information, to client 114 (step 836).

Any errors raised in step 838 are routed to the client through discovery management service 304 (step 836).

Figure 9:
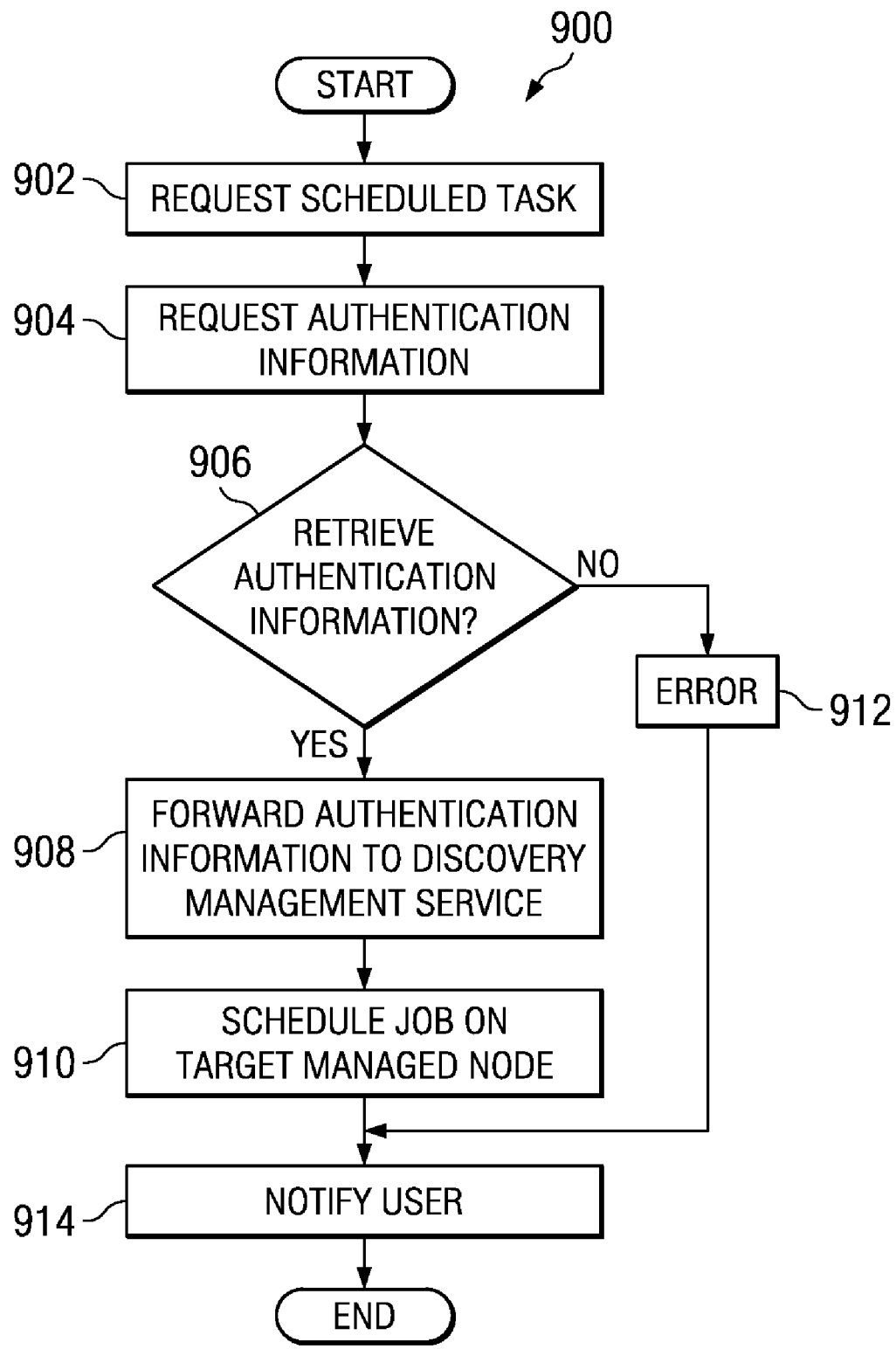
FIG. 9 is a flowchart of a process of requesting a task to be scheduled in accordance with an illustrative embodiment.

With reference now to FIG. 9 there is depicted a flowchart of a process of requesting a task to be scheduled using process 900. A request may be initiated by an authorized user such as an administrator to schedule a discovery task on managed node 320 through client 114 (step 902). Managed node 320 may also contain managed node services 314 comprising log retriever service 316 and dynamic discovery service 318. Log retriever service 316 retrieves log files based on their locations. This service provides a set of operations for retrieving a single log file from a log location, or a set of log files from a number of log locations.

Discovery management service 304 receives the request and forwards to log persistency service 306 to obtain authentication information (step 904). Log persistency service 306 attempts to obtain the appropriate authentication information for managed node 320 (step 906). If "yes" in step 906, the obtained information is forwarded to discovery management service 304 (step 908). Discovery management service 304 then schedules a remote job on managed node 320 (step 910) and notifies the user (step 914). If "no" in step 906, then the requested information was not found and an error is raised (step 912) followed by notification to the user (step 914).

Figure 10:
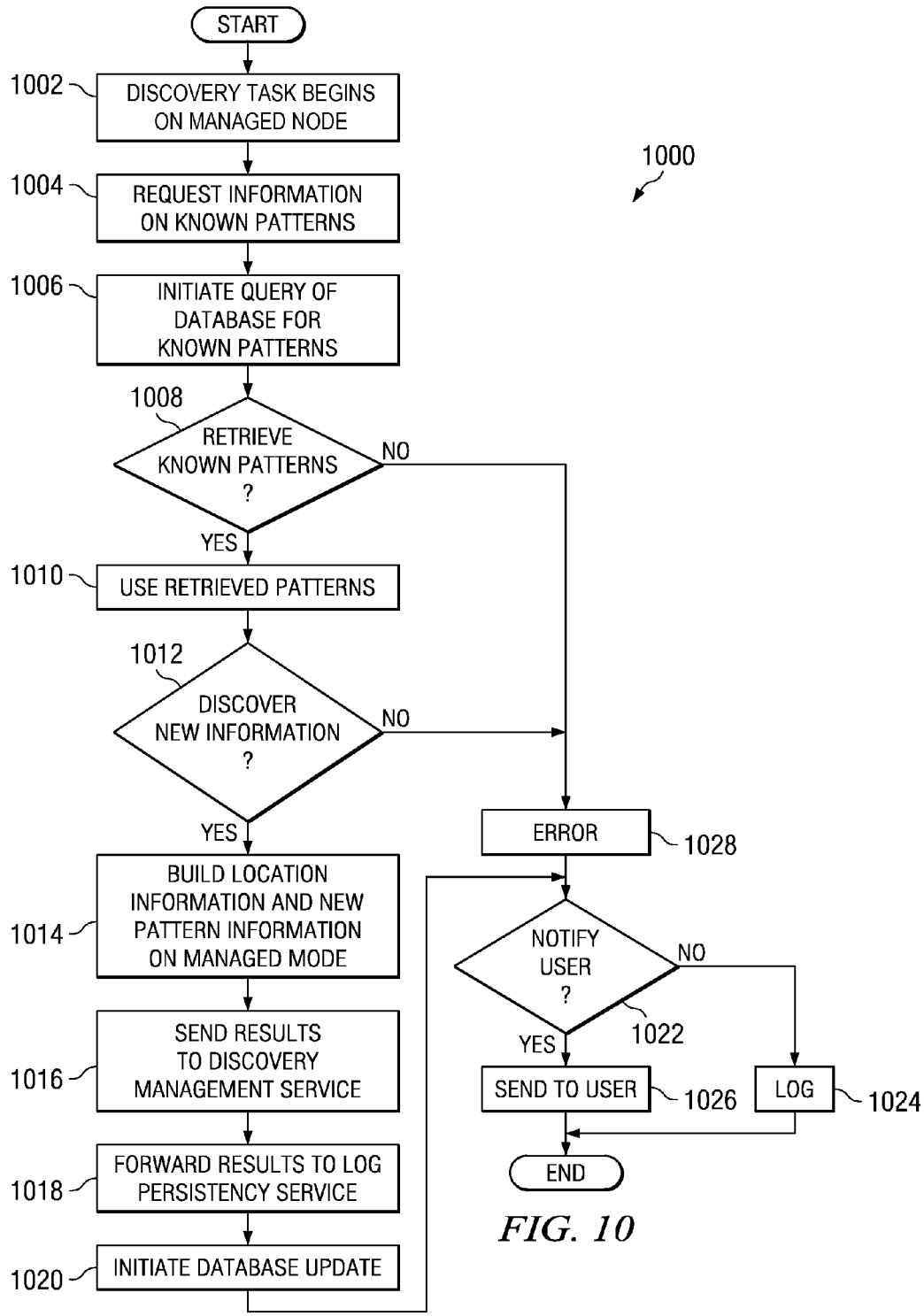
FIG. 10 is a flowchart of a process for dynamically discovering and automatically registering log location information in accordance with an illustrative embodiment.

Turning to FIG. 10, there is depicted a flowchart of process 1000 for dynamically discovering and automatically registering log location information. Process 1000 commences with a discovery task running on managed node 320 (step 1002). Discovery agent 419 requests information from discovery management service 304 regarding known log and application patterns. Discovery agent 419 may alternatively send a request directly to repository knowledge base 312 (step 1004). Discovery management service 304 passes the request to log persistency service 306 that initiates a database query for known patterns (step 1006).

An attempt to retrieve known patterns based on a list of applications as requested is made (step 1008). Repository knowledge base 312 returns a list of known applications and log file patterns which discovery agent 419 may cache for future discoveries in local cache 430. If "no" in step 1008, then an error is raised (step 1028). Next, a determination is made regarding user notification (step 1022). If "no" in step 1022, then error information is written to a log (step 1024). If "yes" in step 1022, the user is notified (step 1026). Then process 1000 terminates.

If "yes" in step 1008, the retrieved patterns are used by discovery agent 419 (step 1010). A determination is then made with respect to the locating of new information (1012). If "no" in step 1012, an error is raised (step 1028). If "yes" in step 1012, the new log location information is gathered in combination with any newly found pattern information on managed node 320. Pattern matcher 422 identifies the list of logs to search for based on matched patterns. Additional parameters including parser identifier, and log file version may be populated by running file type matcher 424 against the content of the discovered log file (step 1014). The results just gathered are sent to discovery management server 304 (step 1016). Discovery management server 304 forwards the results to log persistency service 306 (step 1018). Log persistency service 306 initiates a request to update repository knowledge database 312 with the discovered information (step 1020). A determination is made with respect to notify the user (step 1022). If "yes" in step 1022, the user is notified (step 1026) otherwise if "no" the result of the update request is logged for later use (step 1024). The process then terminates.

Log file patterns are composed of a collection of descriptive attributes defining the identity of the log file. Log file patterns may be composed of descriptors including log file name, file type extensions, directory information and commands that may be invoked to further clarify the log file properties.

Pattern matcher 422, of FIG. 4, matches known patterns with patterns found on the system of interest. File type matcher 424, also of FIG. 4, operates in a similar manner for file types.

Log discovery processes may use discovery agent 419, of FIG. 4, capable of obtaining a list of installed applications from system operating system 426. For example in a Microsoft® Windows® system, serviceability agent 428 would query the registry, while in a Linux™ or UNIX™ based system, discovery agent 419 would request serviceability agent 428 to query with system administration tool. Repository knowledge base 312 may also be a local directory with XML files to specify each products file patterns.

New applications and new log patterns are registered with repository knowledge base 312 once discovered and optionally cached locally.

Pattern matcher 422 may be structured to allow extensions through pluggable components. Pattern matcher 422 may have different levels of analysis. For example, a match metadata, in which only the physical properties of the data are analyzed for matches such as application properties or log file properties. In another example, a match content data in which the physical content of the log input is analyzed, for matches.

Implementation of web service-based embodiments in accordance with illustrative embodiments typically follow a series of steps involving creation of the web services definition language (WSDL) interfaces for the web services to be performed. Log discovery service, as in the embodiment just described, typically comprises a number of distinct web services that work together as a unit. Each service is described along with more granular service interfaces that they may implement.

Dynamic discovery service 318 is invoked for scheduled discoveries and manual discoveries. This service typically provides a set of operations for dynamically discovering log files on a system. The service may implement interfaces comprising CommonServiceOperations and DynamicDiscovery.

Log persistency service 306 stores log file locations and log set information into a central repository, such as repository knowledge base 312 of FIG. 3. This service typically provides a set of operations for creating, deleting, retrieving, and updating the information (log location, host access information, and patterns) in the repository. The service typically implements the interfaces comprising CommonServiceOperations, HostAccess, LogPersistency, LogSetPersistency, and PatternPersistency.

Log retriever service 316 provides a set of operations for retrieving a single log file from a log location, or a set of log files from a number of log locations and typically implements interfaces comprising CommonServiceOperations, LogRetrieval, and LogSetRetrieval.

Context generator service 308 may be implemented as a web service that generates context information specific to a problem determination tool's use of associated log data information. This service provides a set of operations for creating, retrieving and updating the context information. The information allows importation of a set of log files into a problem determination tool, such as that used in an Eclipse environment, based on a log set returned by discovery management service 304. The context generator service typically implements interfaces comprising CommonServiceOperations and Context.

File transfer service 310 may be invoked when retrieving a single log file or a set of log files. This service provides a set of operations for transferring files that would typically be packaged as compressed files from a remote host to the management server. The file transfer service typically implements interfaces comprising CommonServiceOperations and DataTransfer.

Discovery management service 304 is a central service managing all web services of log discovery. The service provides a set of operations for dynamically discovering logs, persisting logs, retrieving logs, and generating context information. In addition, this service also provides operations for access control and domain support. The discovery management service typically implements interfaces comprising AccessControl, CommonServiceOperations, Context, DataCollection, DomainSupport, DynamicDiscovery, HostAccess, LogPersistency, LogRetrieval, LogSetPersistency, LogSetRetrieval, PatternPersistency, and ServiceManagement.

One may then select a method of implementing the WSDL interfaces, for example, for a Java implementation, the above service interfaces can be implemented using Axis 1.1, using the wsdl2java feature to generate the appropriate Java classes. Once the skeleton Java code is completed, the web services can be deployed on any web application server.

The illustrative embodiments herein based on a service-oriented architecture may also be extended in various ways. For example, new problem determination data formats may be added by modeling the new data format using XSD, updating the appropriate service interfaces that will process the new formats, and within the services implementation, add appropriate logic required to process the new data format. In another example, extending service interfaces to provide new operations requires defining the capability to be added, any input or output data types needed to process, and finding the appropriate service interface to extend. Then, add the capability as a new operation to the service interface for backward compatibility, and within the service implementation, add the appropriate logic required.

Plugging in new components underneath the service interfaces typically requires identifying the service interface for which a new component or new implementation is to be provided. In such cases use the existing service interface definition and provide a new service implementation based on the interface. For example, when providing a Java implementation, use of the Axis 1.1. WSDL2Java tool to generate a new set of skeleton interfaces and provide the appropriate implementation. In another example, to replace an implementation of repository knowledge base 312 in FIG. 3 with an implementation of DB2®, generate a new service implementation skeleton and provide the appropriate mapping and functionality to use DB2® as the repository knowledge base 312.

Figure 12:
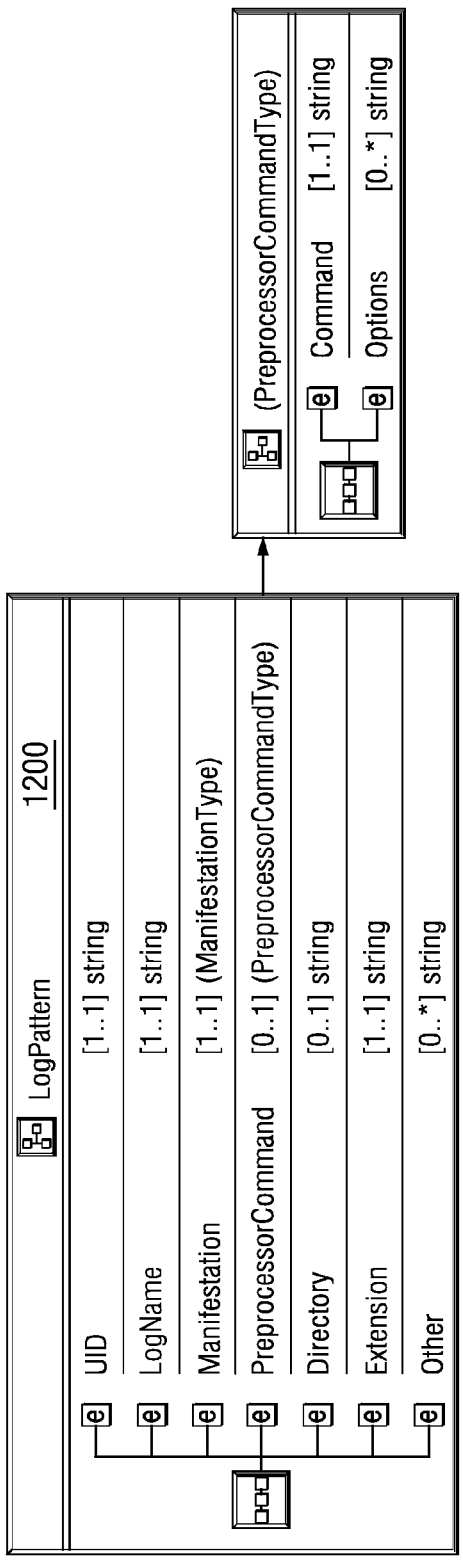
FIG. 12 is a tabular representation of log pattern data type definitions as may be used for the discovery service of FIG. 3 in accordance with illustrative embodiments.
Figure 13:
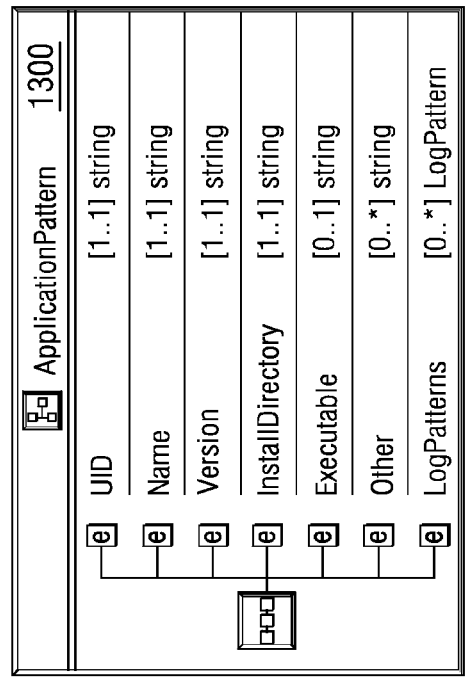
FIG. 13 is a tabular view of application pattern data type definitions as may be used with the discovery services of FIG. 3 in accordance with illustrative embodiments.

With reference now to FIGS. 11-13, illustrative embodiments may be implemented as web services by performing a series of operations, including defining service interfaces for dynamic discovery service 318 as shown in FIG. 3. FIG. 11 illustrates a sample interface 1100 for dynamic discovery service 318. Interface 1100 provides access to operations to cancel a previously scheduled discovery task, schedule a new task, and start a discovery manually. As seen in interface 1100, each operation further includes a reference to discovery task, input, output, and error.

Data type definitions are needed for pattern discovery used by the discovery service of illustrative embodiments. For example, FIGS. 12 and 13 show data types used for defining log file patterns and application patterns, respectively. FIG. 12 depicts a table for log pattern 1200 definitions. The example provides some of the attributes that may be used to describe the log file including the directory where the file is located, the extension as in file type and a log name. FIG. 13 depicts a similar table but now for application pattern 1300. The descriptive information provided in application pattern includes attributes for the application name, the version number and the installation directory, among other attributes. The descriptive information is useful when classifying and understanding the associated log files. Definitions may be provided for the patterns using XML schema definition (XSD). Mapping data types to a repository may be accomplished using a simple table for the mapping between the XSD and the repository.

With reference now to FIGS. 14-16, database table definitions are depicted as may be typically used by the discovery service in accordance with illustrative embodiments. FIG. 14 shows a log patterns database table definition 1400 that may be used by the discovery service of an illustrative embodiment. The database table definition 1400 mirrors that of the data types defined in associated log pattern table 1200 of FIG. 12. Again descriptive information aids in both the administration and operation of illustrative embodiments. Database table definitions for application pattern information may be seen in FIG. 15. Database table definition 1500 relates the data type information from application pattern 1300 of FIG. 13 to the database system and repository knowledge base 312 of FIG. 3. FIG. 16 depicts database table definition 1600 defining the one-to-one relationship between an application pattern and a log pattern as may be implemented in accordance with illustrative embodiments. Database table definition 1600 relates in simple terms a pairing of identified application and log patterns using the identifiers previously defined in database table 1400 and database table 1500.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable type medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a transmission type medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing log information, the computer implemented method comprising:
responsive to receiving a request to discover log information, invoking a set of discovery agents to discover the log information for logs located on a set of managed nodes;
querying the set of managed nodes for information regarding applications on the set of managed nodes;
obtaining known log pattern information and known application pattern information associated with the applications on the set of managed nodes;
identifying, by the set of discovery agents, the log information on the set of managed nodes based upon the known log pattern information and the known application pattern information associated with the applications on the set of managed nodes; and
storing the log information in a repository knowledge base containing log information.

2. The computer implemented method of claim 1, wherein the log information comprises one or more of log location information, log pattern information, and application pattern information.

3. The computer implemented method of claim 1, wherein the request comprises a user-specified criteria.

4. The computer implemented method of claim 1, further comprising:
comparing, using at least one of a pattern matcher and a file type matcher, the information regarding applications on the set of managed nodes with the known log pattern information and the known application pattern information.

5. The computer implemented method of claim 4, wherein the pattern matcher analyses data regarding at least one of physical properties and physical content of the log information to determine a match between the logs and the applications on the set of managed nodes.

6. The computer implemented method of claim 1, wherein querying further comprises use of a serviceability agent on each of the set of managed nodes.

7. The computer implemented method of claim 1, further comprising:
storing the log information in a local cache of the discovery agents.

8. The computer implemented method of claim 1, further comprising:
generating an application context for the log information identified.

9. The computer implemented method of claim 1, further comprising:
requesting a file transfer service, capable of selectively compressing the identified log information identified from the set of managed nodes in accordance with user specified criteria.

10. A data processing system for managing log information, the data processing system comprising:
a bus;
a storage device connected to the bus, the storage device containing computer executable program code;
a communications unit connected to the bus; and
a processor connected to the bus, wherein the processor executes the computer executable program code to:
responsive to receiving a request to discover log information, invoke a set of discovery agents to discover the log information for logs located on a set of managed nodes;
query the set of managed nodes for information regarding applications on the set of managed nodes;
obtain known log pattern information and known application pattern information associated with the applications on the set of managed nodes;
identify, by the set of discovery agents, the log information on the set of managed nodes based upon the known log pattern information and the known application pattern information associated with the applications on the set of managed nodes; and
store the log information in a repository knowledge base containing log information.

11. The data processing system of claim 10, further comprising computer executable program code to:
compare, using at least one of a pattern matcher and a file type matcher, information regarding applications on the set of managed nodes with the known log pattern information and the known application pattern information.

12. The data processing system of claim 11, wherein the pattern matcher analyses data regarding at least one of physical properties and physical content of the log information to determine a match between the logs and the applications on the set of managed nodes.

13. The data processing system of claim 10, further comprising computer executable program code to store the log information in a local cache of the discovery agents.

14. The data processing system of claim 10, further comprising computer executable program code to generate an application context for the log information identified.

15. The data processing system of claim 10, further comprising a file transfer service, capable of selectively compressing the log information identified from the set of managed nodes in accordance with user specified criteria.

16. A computer program product for managing log information, the computer program product comprising:
a computer usable recordable type medium having computer executable program code tangibly embodied thereon, the computer executable program code comprising:
computer executable program code responsive to receiving a request to discover log information, for invoking a set of discovery agents to discover the log information for logs located on a set of managed nodes;
computer executable program code for querying the set of managed nodes for information regarding applications on the set of managed nodes;
computer executable program code for obtaining known log pattern information and known application pattern information associated with the applications on the set of managed nodes;
computer executable program code for identifying, by the set of discovery agents, the log information on the set of managed nodes based upon the known log pattern information and the known application pattern information associated with the applications on the set of managed nodes; and
computer executable program code for storing the log information in a repository knowledge base containing log information.

17. The computer program product of claim 16, further comprising computer executable program code for comparing, using at least one of a pattern matcher and a file type matcher, the information regarding applications on the set of managed nodes with the known log pattern information and the known application pattern information.

18. The computer program product of claim 17, wherein the pattern matcher analyses data regarding at least one of physical properties and physical content of the log information to determine a match between the logs and the applications on the set of managed nodes.

19. The computer program product of claim 16, further comprising computer executable program code for storing the log information in a local cache of the discovery agents.

20. The computer program product of claim 16, further comprising computer executable program code for generating an application context for the log information identified.

* * * * *